(12) United States Patent
Haigh

(10) Patent No.: US 7,100,724 B2
(45) Date of Patent: Sep. 5, 2006

(54) ROCKING DEVICE

(76) Inventor: William Barry Haigh, Sticks Farm, Sticks Lane, Carnaby, Bridlington (GB) YO15 3QH ( * ) Notice: Subject to any disclaimer, the term of this patent is extended or adjusted under 35 U.S.C. 154(b) by 211 days.

(21) Appl. No.: 10/479,440

(22) PCT Filed: Jun. 17, 2002

(86) PCT No.: PCT/GB02/02708

§ 371 (c)(1),
(2), (4) Date: Dec. 1, 2003

(87) PCT Pub. No.: WO03/000533

PCT Pub. Date: Jan. 3, 2003

(65) Prior Publication Data

US 2004/0212161 A1  Oct. 28, 2004

(30) Foreign Application Priority Data

Jun. 22, 2001 (GB) ................... 0115295.8
Apr. 12, 2002 (GB) ................... 0208417.6

(51) Int. Cl.
*B62B 9/22* (2006.01)

(52) U.S. Cl. .......................... 180/166; 5/109

(58) Field of Classification Search ............. 180/166; 280/47.1; 5/108, 109; 248/651, 669
See application file for complete search history.

(56) References Cited

U.S. PATENT DOCUMENTS

| | | | | |
|---|---|---|---|---|
| 2,689,355 A | * | 9/1954 | De Frank | 5/109 |
| 2,888,086 A | * | 5/1959 | O'Brien | 104/302 |
| 4,768,497 A | * | 9/1988 | Winge | 601/26 |
| 4,837,876 A | * | 6/1989 | Levy | 5/107 |
| 5,002,144 A | * | 3/1991 | McMahon | 180/166 |
| 5,249,640 A | * | 10/1993 | Grove | 180/166 |
| 5,803,885 A | * | 9/1998 | Tiller | 482/146 |

FOREIGN PATENT DOCUMENTS

| | | | |
|---|---|---|---|
| EP | 0 302 971 A1 | * | 2/1989 |
| GB | 1 565 501 | * | 4/1980 |
| WO | 94/23618 | * | 10/1994 |

* cited by examiner

*Primary Examiner*—Frank Vanaman
(74) *Attorney, Agent, or Firm*—David A. Guerra

(57) ABSTRACT

A rocking device is described for receiving a lower part of a carriage, perambulator, cot or the like in particular to rock an infant therein, with oscillation means to impart an oscillating motion thereto comprising an elongate roller (2) mounted about a generally longitudinal axis, and drive means (9) associated therewith to cause the roller to rotate, the transverse shape of the roller and the position of the axis together being such that the roller imparts an oscillating motion to the carriage in mechanical engagement therewith in use. A method of rocking a carriage, perambulator, cot or the like is also described.

18 Claims, 3 Drawing Sheets

ROCKING DEVICE

CROSS-REFERENCE TO RELATED APPLICATIONS

This application is an U.S. national phase application under 35 U.S.C. §371 based upon co-pending International Application No. PCT/GB02/02708 filed Jun. 17, 2002. Additionally, this U.S. national phase application claims the benefit of priority of co-pending International Application No. PCT/GB02/02708 filed Jun. 17, 2002, United Kingdom Application No. GB 0115295.8 filed Jun. 22, 2001, and United Kingdom Application No. GB 0208417.6 filed Apr. 12, 2002. The entire disclosures of the prior applications are incorporated herein by reference. The international application was published in the English language on Jan. 3, 2003 under Publication No. WO 03/000533 A1.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a device and method for imparting an oscillating or rocking motion to a carriage, perambulator, cot bed or the like, in particular for soothing a baby or infant therein.

It is well known that distressed and crying babies in a carriage, pram, cot or the like can be soothed by rocking. This is particularly so when the baby is in a wheeled carriage, which facilitates the application of a continuous rocking motion for a period of time to soothe the baby.

Conventionally, the rocking action is applied directly to the baby's carriage by the baby's parent or other carer. However, this procedure, although effective, is time consuming, physically demanding, and likely to be frustrating particularly having regard to the already frustrated state of mind which the carer may find triggered by the baby's continuous crying. The development of a mechanical device which the carer could therefore use to impart this rocking motion would clearly be beneficial.

2. Description of Related Art

Whilst a number of devices exist in more developed technical fields to impart oscillating motion to bodies contained therein, it is an overriding consideration for devices for use by the parents or other carer's of babies and young children that the devices should be of suitable scale, robust, and mechanically simple (both for ease of operation and to keep costs reasonable). In consequence, many known oscillating devices are likely to be unsuitable for this application.

A number of mechanical devices exist which impart horizontal, reciprocating oscillation to a baby carriage (for example UK Patent Application 2061836, 2191448 and 2145981). However, these fail to take advantage of the known soothing effect which can be attributed to at least some degree of vertical rocking motion.

An attempt to provide a device for importing a rocking motion including an up-and-down element to a baby carriage is described in U.S. Pat. No. 5,002,144. In this device a drive motor drives torque converters which act on lifting cams to cause up and down motion of pistons, the pistons acting on a wheel receiving plate to produce a rocking motion on the pram wheels. Although this device produces an up and down motion, it is of considerable mechanical complexity, and is therefore inherently likely to be less robust and more expensive than would a simpler design.

Moreover, U.S. Pat. No. 5,002,144 concentrates on up and down motion only, whereas in practice a combination of up and down and reciprocating motion, and in particular an orbital oscillation motion, has been shown to be effective. Attempts have been made to adapted reciprocating drive systems for use in conjunction with ramps (see for example UK patent 2 150 086) to give motion in both a vertical and horizontal sense, but these are cumbersome, and motion is still essentially linear rather than orbital.

BRIEF SUMMARY OF THE INVENTION

It is an object of the present invention to provide a baby rocker and associated rocking method which mitigate some or all of the above disadvantages, and in particular to provide a baby rocker and method which is capable of imparting at least some vertical oscillation whilst at the same time remaining relatively mechanically simple. It is a particular object of the present invention to provide a baby rocker and associated rocking method which is capable of imparting at least some oscillation both in a vertical and horizontal sense, and in particular an orbital motion.

According to a first aspect of the invention, a rocking device in its broadest embodiment comprises means for receiving a lower part of a carriage, perambulator, cot bed or the like, an oscillation means for imparting an oscillating motion thereto comprising an elongate roller mounted about a generally longitudinal axis, and drive means associated therewith to cause the roller to rotate, the transverse shape of the roller and the position of the axis together being such that the roller imparts an orbital oscillating motion to the carriage in mechanical engagement therewith in use.

The elongate roller is disposed generally horizontally, and is mounted about a generally horizontal axis. The transverse profile of the roller surface and the axis together ensure that as the roller rotates, the position of the point of the roller's surface acting on the carriage in mechanical engagement therewith oscillates orbitally (i.e. both upwards and downwards and laterally). This is achievable primarily in that in the roller is mounted about an eccentric axis. The roller may have a generally circular-cylindrical shape, and such a construction will be preferred in many instances for simplicity. Alternatively, the orbital motion may be modified in that the roller itself may be eccentrically shaped (i.e. non-circular) in transverse section. For example, the roller may be of elliptical section.

The lower part of the carriage is so located as to be in mechanical association with the roller. The roller may thus be used to be impart such orbital oscillating motion to the baby carriage, perambulator, cot or the like. The motion is applied by the roller either by acting directly on a lower portion of the carriage (the roller then comprising part of the receiving means) or by acting on an engagement surface of a separate receiving means to impart orbital oscillating motion thereto which receiving means transmits motion to a carriage received thereon.

Thus, the device in accordance with the invention is capable of imparting an orbital oscillation to a baby carriage or cot in a device whilst remaining of great mechanical simplicity when compared with prior art devices having the same capability. In particular, it can be noted that at its simplest a single moving part is sufficient to convert the drive from the drive means to orbital motion of the carriage.

The geometry of the roller and of its mounting are such that if the carriage is mechanically engaged therewith in appropriate orientation, the carriage may be urged to oscillate in both a vertical and a horizontal sense, and in particular, if appropriately located, the roller will impart an orbital motion to the carriage in mechanical engagement therewith.

Accordingly, the receiving means are preferably so configured as to locate the carriage in position in mechanical engagement with roller such that the roller impart an oscillating motion to the carriage having both a horizontal and a vertical component so that the roller imparts an orbital motion to the carriage.

The roller is mounted on a suitable housing, which is provided with a lower surface adapted to engage the ground to maintain the stability of the device. As the roller rotates, the effect of eccentric mounting and optional eccentric transverse section is that the uppermost surface of the roller presented to engage the carriage periodically varies in position relative to the ground, imparting an orbital rocking motion.

In accordance with the invention an eccentrically mounted roller is used to impart an orbital motion to the carriage. In particular, the eccentrically mounted roller presents a generally cylindrical rolling surface. In a simple embodiment the roller comprises a solid or hollow elongate cylinder having an offset axial mounting. However, it will be understood that the principles of the invention do not require the cylinder to be complete, and mounted about a physical axis, but extend to cover any mounted roller structures having one or more rolling surfaces of generally circular or arcuate symmetry and mounted such as to impart an orbital motion about a real or virtual eccentric axis. For example, the roller may comprise an elongate central structural portion, offset mounted, and provided with one or more annular rolling surface portions whose radially external surfaces comprise the rolling surfaces in use. This might have advantages for example in terms of reduced weight, material selection, provision of bearings etc.

References herein to a baby carriage are to any object in which a baby or infant may be placed, whether a wheeled carriage or a static cot or the like. However, the invention is particularly applicable to wheeled carriages such as perambulators, buggies, push-chairs and similar. For this application, the receiving means are preferably adapted to receive the wheels of the wheeled carriage. Where the wheeled carriage has more than one pair of wheels, the receiving means is conveniently adapted to receive just one such pair, in particular having a common axle, the other pair(s) being able to rest upon the ground. The action of the roller on the receiving means thereby imparts an orbital motion to the carriage which the other wheels on the ground are able to accommodate.

The invention is particularly suited to rocking a baby carriage or cot and examples are given in that context but it will be understood the same principle could be applied to rocking a bed for an infant or even an adult.

In a preferred embodiment, particularly applicable to, though not limited to, use with a wheeled carriage, the device comprises a plurality of rollers, and in particular a pair of generally parallel rollers. It is not necessary for all such rollers to be oscillators, and at least some of the rollers, and where a pair of rollers are provided one of the pair, may be centrally mounted and circular-cylindrical. This embodiment is particularly suited to wheeled carriages, with a pair of rollers serving as a particularly stable means for receiving a wheel or wheels of the carriage, and in particular a single pair of wheels having a common axle. Preferably, the oscillating roller is similarly generally circular cylindrical, but mounted on an eccentric axis.

Such an arrangement is particularly effective in imparting an orbital motion including both horizontal and vertical components to the carriage, since as the wheels engage between a pair of rollers, one of which is configured to impart eccentric motion, an orbital oscillating motion will be inherently produced.

It will be appreciated that it is not necessary to associate the drive means directly with both rollers of such a pair. Preferably, one roller is driven and the other is freely rotating. In the embodiment where at least a pair of rollers comprises an oscillating roller such as an eccentrically mounted roller and a centrally mounted cylindrical roller, it will normally be preferable for the drive means to act directly upon the oscillating roller, but it will be appreciated that this is not a strict requirement, and that the centrally mounted roller could be driven directly, transmitting rotational drive to the oscillating roller through the wheels for a wheeled carriage engaged thereon for example.

In an alternative embodiment a single oscillating roller may be provided, adapted to act upon the receiving means, for example in the form of a mounting means mechanically engaged thereupon, to impart an orbital motion to a carriage or the like positioned upon the receiving means in use.

The roller or rollers may serve to comprise, at least in part, the means for receiving the lower part of the carriage. As indicated, such an arrangement is particularly effective for receiving the wheels of a wheeled carriage, and in particular a single pair of wheels having a common axle. Additionally or alternatively, a mounting plate may be provided comprising a mounting portion which seats over at least the oscillating roller and a receiving portion for receiving the lower part of the said carriage. The receiving portion may seat and in use reciprocate over other non eccentric roller(s) where present. Alternatively, such other roller(s) may be dispensed with entirely or be replaced or supplemented by bearings over which the receiving portion may seat and in use reciprocate when driven by the eccentric roller.

The receiving portion may merely provide a base for the wheels or legs of a carriage, or may incorporate or have provision for retaining means to stably retain the same.

In the case of the embodiment of the invention comprising a plurality of rollers, it will be appreciated that the mounting plate may comprise further mounting portions to seat over some or all of the further rollers, and optionally further receiving portions as the case may be. The mounting plate will in use reciprocate over the further rollers where present as it is driven by the eccentric oscillating roller. Alternatively, such other rollers may be dispensed with entirely or be replaced or supplemented by bearings over which the receiving portion may seat and in use reciprocate when driven by the eccentric oscillating roller.

In a preferred embodiment comprising an eccentrically mounted roller and a centrally mounted roller, both generally circular-cylindrical, the mounting plate comprises a first mounting portion configured to engage the eccentrically mounted roller, a second mounted portion configured to engage the centrally mounted roller, and a receiving portion therebetween. Conveniently, the mounting plate extends laterally over a substantial part of the length of the rollers, and further preferably the receiving portion has a generally U-shaped transverse section, the first mounting portion has a generally L-shaped section extending laterally across and then projecting vertically down to engage the eccentric roller in use, and the second mounting portion comprises a laterally extending lip to seat upon the centrally mounted roller in use. This arrangement provides maximum stability of engagement with the eccentrically mounted roller, whilst allowing some lateral movement of the plate in sliding engagement with the centrally mounted roller during use to improve stability.

In an alternative embodiment comprising a generally circular-cylindrical eccentrically mounted roller only, within a suitable roller housing, the mounting plate comprises a first mounting portion configured to engage the eccentrically mounted roller, a second mounted portion configured to engage a laterally spaced portion of the roller housing, in particular in pivoting and/or sliding engagement to facilitate orbital motion of the mounting plate under impulse of the eccentrically mounted roller in use, and a receiving portion therebetween. In the absence of the second roller, bearing surfaces and in particular rotational bearings are provided at the said laterally spaced portion of the roller housing to facilitate sliding engagement of the mounting plate thereon under impulse of the eccentrically mounted roller.

The mounting plate is preferably detachable. Provision of a detachable mounting plate is of particular advantage in embodiments of the invention where the roller or rollers are configured to comprise at least part of the engagement means for a wheeled carriage. Using the mounting plate then provides an alternative means of mounting, and in particular allows the option where the roller(s) are specially adapted to receiving a wheeled carriage with wheels of a given size or configuration of using the device also in conjunction with un-wheeled carriages or carriages with other wheel arrangements or sizes.

The or each roller is manufactured from any suitable material capable of providing the requisite strength and stiffness for the application envisaged. Preferably, the or each roller is of tubular construction. Preferably, the or each roller is manufactured from a reasonably stiff metallic material, such as tubular steel.

Alternatively, the or each roller may be fabricated from a stiff plastics material, such as a fibre reinforced composite material, for reduced weight.

Similarly for reduced weight the or each roller may be hollow rather than solid, and/or may have an open structure in which the rolling surface is not a complete cylinder but comprises only surface portions suitable for engaging a mounting means or carriage in use.

The or each roller may be provided with a surface layer, for example of rubber or plastics material, to provide additional surface properties, for example in relation to improving engagement of the carriage and/or mounting plate thereon. Similarly, the surface may comprise additional means to effect and/or improve engagement of the carriage thereon.

Additionally or alternatively, the surface of the or each roller may comprise projections, undulations or other like adaptations configured to impart further oscillation to a carriage mounted thereon (that is oscillation additional to that arising as a consequence of the overall transverse shape and/or eccentric mounting of the oscillating roller). In a preferred embodiment, at least one roller is provided with small surface projections to impart additional oscillation. In this embodiment the roller imparts both a larger scale longer period oscillation attributable to the overall transverse shape and/or eccentric mounting and a smaller scale shorter period oscillation attributable to the uneven surface. This combined effect can be beneficial, mimicking, for example, the acknowledged effect of rocking a pram back and forth over the edge of a carpet.

The or each roller and/or surface portions thereof are preferably removable to provide alternative configurations in which first a smooth roller is provided, producing a single oscillation type, and second an undulating roller is provided, producing the bi-modal oscillation effect as above described. This allows the user to choose the most effective. It may be noted that the former is often more effective for the youngest babies, and the latter for older infants.

Any suitable drive means may be used to drive the device, but a simple electric motor is likely to be preferred. The drive means may act directly to rotate the driven roller, or may act through a suitable drive belt or the like. Where an electric motor is used, the device preferably further comprises a means to engage the electric motor with a suitable power supply. Typically, this will be the domestic mains supply. In these circumstances, an electric motor may be driven directly at mains voltage, but the device preferably further comprises a suitable transformer to step down the domestic mains supply voltage to a preferred operating voltage, which will be considerably lower for safety. For example, this will step down the European domestic supply voltage of 220 V/240 V to a lower motor voltage (for example 12 V or 24 V).

The drive means has preferably associated therewith a timing means, which may be preset by the user to a predetermined time, after which it will switch off the drive means. This further minimises the degree of the baby's caress involvement in the operation of the device.

Optionally the system could also include a sound generator, such as a tape player, to play suitable soothing sounds during use (music, mother's voice etc). This can also be linked operatively to the timing means.

Additionally, the drive means preferably has associated therewith speed control means to allow the user to control the speed at which the roller is rotated, and hence the frequency of oscillation.

The device may further comprise other means to soothe the baby, in particular means which take the form of soothing visual and/or aural stimuli.

The device may be user actuated, or may provide further means to actuate automatically, for example in response to the baby's crying.

In accordance with a further aspect of the invention, there is provided a method of rocking a baby's carriage, comprising the steps of locating a lower part of a carriage, perambulator, cot or the like in mechanical association with an elongate, generally horizontally mounted roller, wherein the transverse shape of the roller and the position of the mounting axis are together such that the roller is capable of imparting and oscillating motion to the carriage, perambulator, cot or the like, causing the said roller to rotate by operation of suitable drive means, thereby imparting an oscillating motion to the lower part of the carriage, perambulator, cot or the like.

Preferably, the method is used with wheeled carriages, and the roller is adapted to receive a wheel or wheels of such wheeled carriages. In a preferred embodiment of the method, a plurality of rollers is provided, and more preferably a pair of rollers comprising an eccentrically mounted roller and a centrally mounted roller is provided, and the first step of the method comprises locating wheel or wheels of wheeled carriage in position therebetween.

Further preferred features of the method will be understood by analogy to the device features above described.

According to a further aspect of the invention there is provided a kit of parts for a baby rocker comprising a housing for receiving at least one roller in an eccentric mounting and/or for receiving at least one roller having an eccentric transverse profile drive means to cause the roller to rotate, at least one roller, and preferably a plurality of rollers having different surfaces and/or a plurality of interchangeable roller surfaces, and optionally further comprising a mounting plate to seat over the oscillating roller.

BRIEF DESCRIPTION OF THE SEVERAL VIEWS OF THE DRAWINGS

The invention will now be described by way of example only with reference to the accompanying drawings in which.

DETAILED DESCRIPTION OF THE INVENTION

Figure 1:
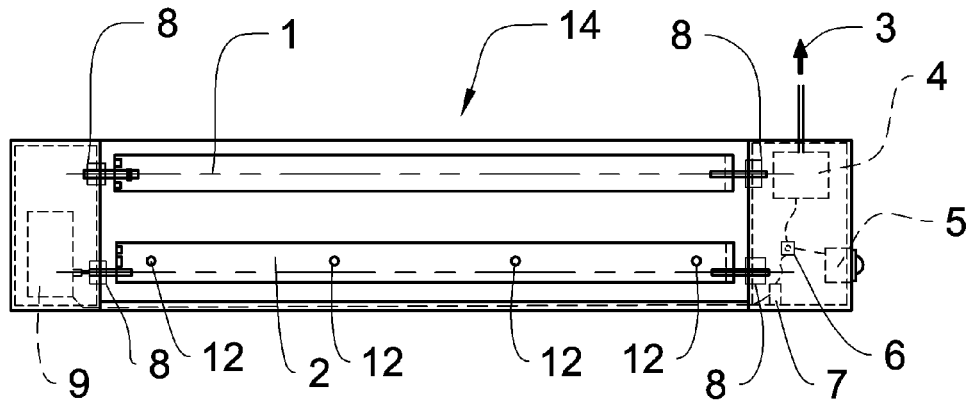
FIG. 1 is a plan view of a baby rocker in accordance with the present invention.
Figure 2:
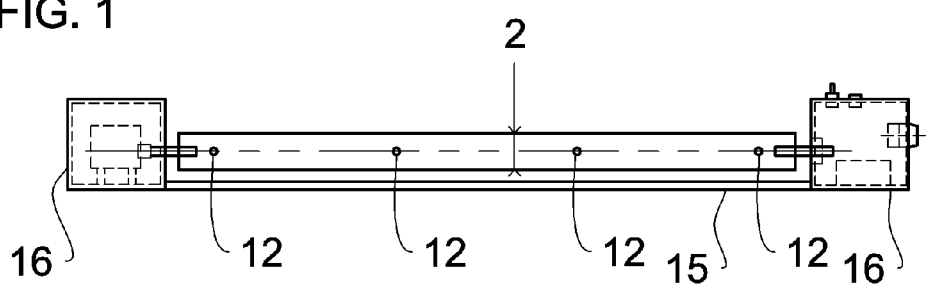
FIG. 2 is a side elevation of the same.

Referring first to FIGS. 1 and 2, a pair of elongate rollers 1, 2 are shown mounted in parallel in a roller housing (14). The pair of rollers comprises a concentrically mounted idler roller (1) and an eccentrically mounted driven roller (2), both rollers mounted through bearings (8).

The eccentrically mounted driven roller (2) is powered by a drive means in the form of a 12 volt motor (9) which is adapted to receive regular mains power, from a power supply (3). A transformer (4) steps this down to 12 volts, and power is then supplied to the motor by power cable (17) through cable conduits (10). Associated with the power source are a timer switch (5), a two speed toggle-switch to control rotational speed (7), and a fuse (6) of a rating suitably selected to prevent engine burn-out problems if the device is excessively loaded.

The whole device is contained within a housing (14) comprising a base plate (15) designed to engage with and give stable support upon the ground, and mounting portions (16) which hold the bearings and components associated with the power supply and drive means.

Figure 3:
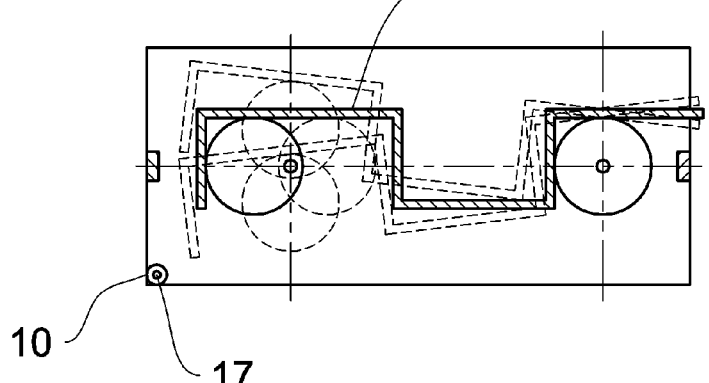
FIG. 3 is a schematic transverse section of the device of FIG. 1 further incorporating a receiving plate.

Operation of the device is illustrated schematically in FIG. 3. In FIG. 3, the device is shown in use with an optional mounting plate (13) engaged upon the rollers. It will be understood from the text above that this mounting plate may be dispensed with, and, for example, the wheels of a pram or the like engaged directly upon and between the rollers.

FIG. 3 illustrates the position of the concentric roller (1), eccentric roller (2), and optional mounting plate (13), both in an initial position (solid line) and in a series of further positions as the eccentric roller is caused to rotate by the motor (broken lines).

As the eccentric roller rotates, it imparts a rocking motion incorporating the significant up and down element to the mounting plate (13) in the embodiment illustrated; or alternatively directly to the carriage and in particular to wheels of the carriage. In this way, a rocking motion may be applied to the carriage to soothe the baby inside.

The rollers are of tubular construction, and in this embodiment are of tubular steel. A plastic surface layer may be applied to improve adhesion with the pram wheels or the like. However, alternative materials both for the body of the roller and for any surface treatments will readily suggest themselves.

Figure 4:
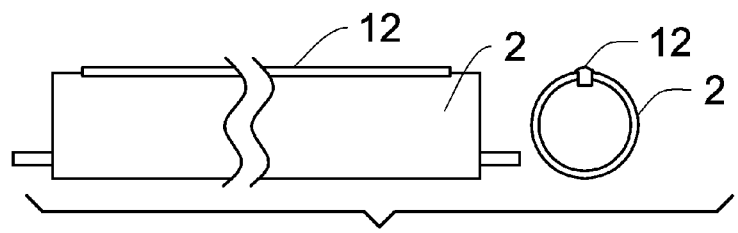
FIG. 4 is a transverse section of a preferred embodiment of roller for use with the device of FIGS. 1 to 3.

A particularly preferred embodiment of roller is shown in cross-section in FIG. 4. In this case, apertures are provided within the tube for receiving detachable rubber stubs (12). Once in place, the rubber stubs (12) project out from the roller surface. The rubber stubs may be arrayed along the length of the roller, or may take the form of an elongate ridge along the roller surface. In either case, the purpose of the stub is to impart further oscillation to a carriage mounted thereon, in addition to the oscillation already imparted as a result of the eccentric mounting of the roller (2). The effectiveness of this type of oscillation will be well understood by analogy to the recognised enhanced effect produced by rocking a pram backwards and forwards over a surface irregularity, such as a carpet edge.

Figure 5:
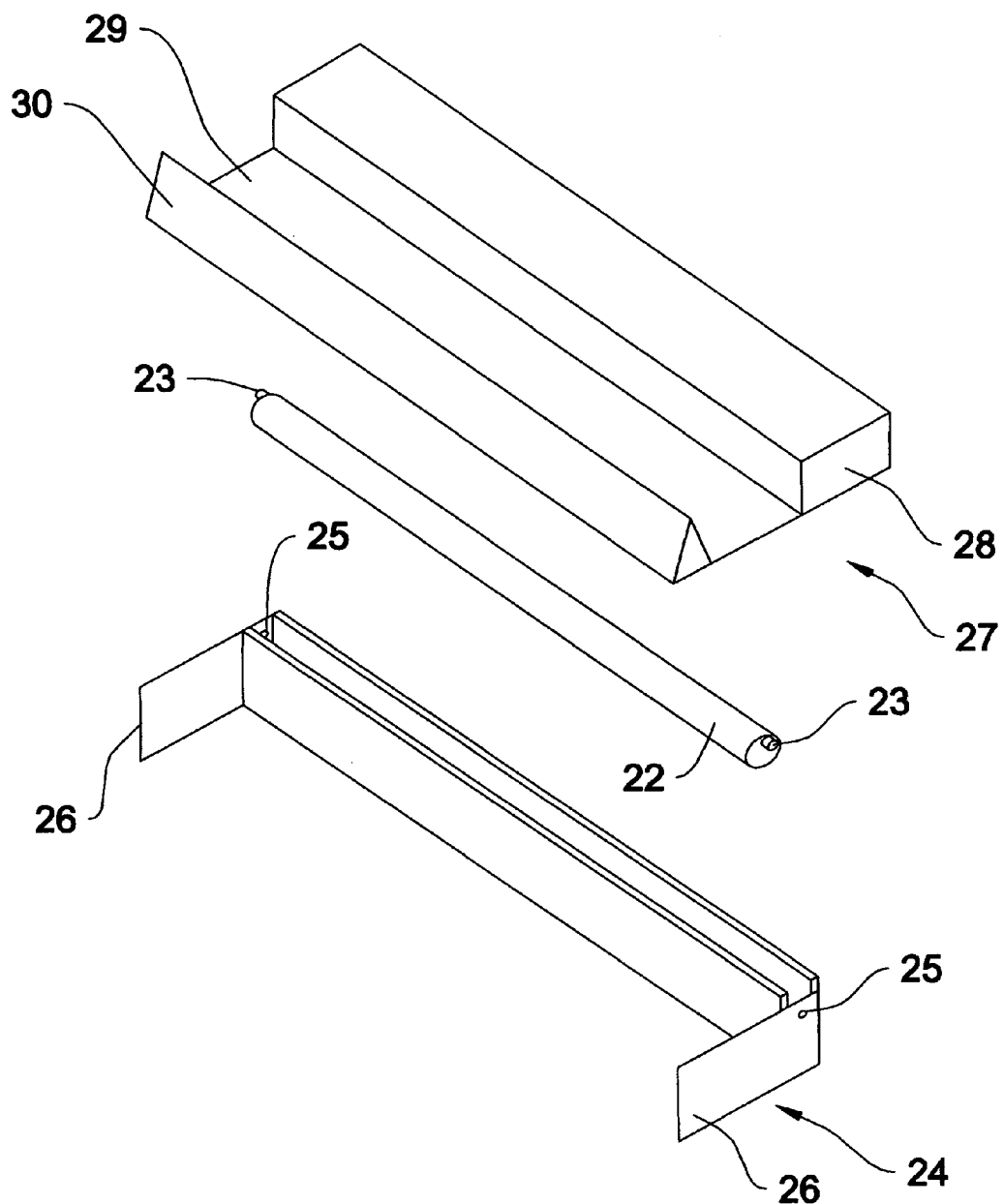
FIG. 5 is an exploded perspective view of an alternative embodiment of a baby rocker in accordance with the present invention.

Referring to FIG. 5, an alternative embodiment of the baby rocker is shown in which only a single, eccentrically mounted roller is provided in conjunction with a mounting plate to impart a rocking motion to a carriage or the like.

An eccentrically mounted driven roller (22) is mounted in use in a roller housing (24) by means of off-centred mounting lugs (23) which are received in apertures (25) in side walls (26) of the housing (24). The eccentrically mounted driven roller (22) is powered by a suitable drive means (not shown) which may be in the form of the drive means in the previous embodiment or any other suitable form.

The rocking motion is imparted to a carriage or the like mounted upon a mounting plate (27) which is in use received over the eccentrically mounted roller by means of the hollow mounting section (28). The mounting plate (27) further includes a flat carriage support area (29) with a suitable non slip surface or the like, and raised portion (30) rearward of the flat portion (29) to safely retain wheels or legs of a carriage or the like in position in use and prevent them sliding out as the mounting plate (27) oscillates under action of the eccentrically driven roller (22).

Figure 6:
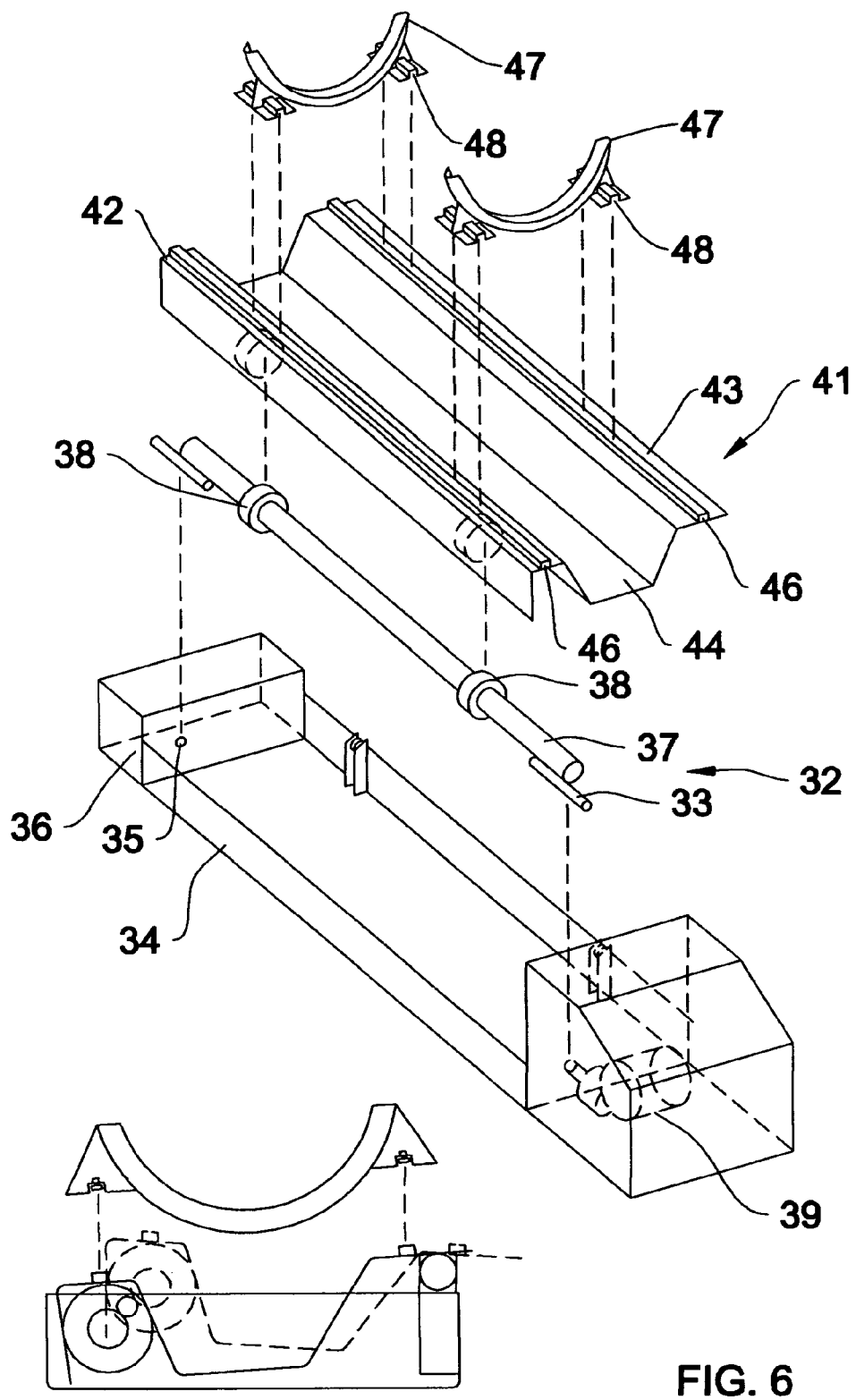
FIG. 6 is an exploded perspective view of a further alternative embodiment of a baby rocker in accordance with the present invention.

FIG. 6 is an alternative embodiment of baby rocker in which, in like manner to FIG. 5, only a single eccentrically mounted roller is provided in conjunction with a mounting plate. However, in this embodiment, an alternative arrangement of roller is shown.

An eccentrically mounted driven roller (32) is mounted in use in a roller housing (34) by means of mounting projections (33) which are received in apertures (35) in side walls (36) of the housing (34).

The roller in this instance comprises, in addition to the mounting projections (33), a central structural cylindrical portion (37) and a pair of annular bearings (38) positioned therearound which in use provide the surfaces in rolling engagement with a mounting plate (41). The combination of mounting projections (33), structural member (37) and bearings (38) thus comprises an eccentric roller arrangement equivalent to the roller (22) in FIG. 5.

The roller arrangement is driven by the electric motor (39). The bearings (38) are received in a hollow mounting section (42) of the mounting plate (41) and in part an orbital motion thereto. The mounting plate (41) has a flat carriage support area (44) in like manner to the mounting plate of FIG. 5 and on which the wheels or legs of a carriage or the like can be safely retained as the mounting plate oscillates under action of the roller arrangement. A rearward part (43) of the mounting plate slidingly engages over a rear edge of the housing. In accordance with the arrangement, action of the roller arrangement imparts an orbital motion to the mounting plate (41), and in particular the carriage support area (44), and thereby to the wheels or legs of a carriage or the like placed thereupon.

An optional wheel support clip (47) is provided, particularly to accommodate larger-wheeled prams and the like, which might otherwise not rest so stably on the area (44). A base (48) of the wheel support slidingly engages with a ridged engaging portion (46) on the mounting section (42) and rearward extension (43) of the mounting plate (41). The wheel rests in the arcuate upper part of the clip. Different clips may be provided to accommodate differently-sized wheels.

What is claimed is:

1. A rocking device for imparting an oscillation motion to a carriage, perambulator, or cot bed, said rocking device comprising:
   a housing including a base plate and a plurality of mounting portions;
   a concentrically mounted idler roller and an eccentrically mounted driven roller, said idler roller and said driven roller are mounted in parallel in said housing, said driven roller being a hollow tube and further comprising at least one aperture defined in said driven roller;
   at least one stub for imparting further oscillation, said stub being removably attachable in said aperture of said driven roller and projecting out from said driven roller;
   a drive means for driving said driven roller; and
   a mounting plate engagable upon said idler and driven rollers, said mounting plate having a flat support area recessed between said idler roller and said driven roller.

2. The rocking device as set forth in claim 1 further comprising wherein said driving means is an electric motor.

3. The rocking device as set forth in claim 2 further comprising a fuse, a two speed toggle switch, a timer switch, and a transformer, all of which are in electrical communication with said electric motor.

4. The rocking device as set forth in claim 2 further comprising a cable conduit for receiving a power cable for said electric motor, said conduit running parallel with said idler and driven rollers.

5. The rocking device as set forth in claim 1, wherein said idler and driven rollers are removably positionable on said housing through bearings located on the ends of said rollers, said bearings being supported in said housing by said mounting portions.

6. The rocking device as set forth in claim 1, wherein said idler and driven rollers have a plastic surface layer.

7. The rocking device as set forth in claim 1, wherein said stub is made of rubber.

8. The rocking device as set forth in claim 1, wherein said stub is an array of stubs positionable along the length of said driven roller.

9. The rocking device as set forth in claim 1, wherein said stub is an elongate ridge positionable along said driven roller.

10. A rocking device for imparting an oscillation motion to a baby supporting unit, said rocking device comprising:
    a housing having side walls and apertures defined in said side wall of said housing;
    an eccentrically mounted driven roller removably attachable in said housing through off-centered mounting lugs extending out from the end of said driven roller, said mounting lugs being receivable in said apertures in said side walls of said housing;
    a drive means for driving said driven roller; and
    a mounting plate having a hollow mounting section, a flat support area adjacent said hollow mounting section, and a raised portion adjacent said flat support area, said hollow mounting section being engagable upon said driven roller, said raised portion being adapted to retain the baby supporting unit in said flat support area and against said hollow mounting section.

11. The rocking device as set forth in claim 10, wherein said driving means is a motor, said motor being in electrical communication with a fuse, a two speed toggle switch, a timer switch, and a transformer.

12. The rocking device as set forth in claim 10, wherein said driven roller being a hollow tube including at least one aperture defined in said tube, and further comprising at least one stub for imparting further oscillation, said stub being removably attachable in said aperture of said driven roller and projecting out from said driven roller.

13. The rocking device as set forth in claim 10, wherein said raised portion is tapered so as to retain the baby supporting unit in said flat support area and against said hollow mounting section.

14. A rocking device for imparting an oscillation motion to a baby supporting unit, said rocking device comprising:
    a housing having side walls and apertures defined in said side walls of said housing, and a rear edge;
    an eccentrically mounted driven roller having mounting projections, a central structural cylindrical portion, and a pair of annular bearings positionable around said central cylindrical portion, said driven roller being removably attachable in said housing through said mounting projections, said mounting projections being located on the outer surface of the ends of said central cylindrical portion and receivable in said apertures in said side walls of said housing;
    a drive means for driving said driven roller;
    a mounting plate having a hollow mounting section, a flat support area adjacent said hollow mounting section, a raised portion adjacent said flat support area opposite said hollow mounting section, a ridged engaging portion located on said hollow mounting section and said raised portion, said raised portion slidingly engages over said rear edge of said housing, said raised portion being adapted to retain the baby supporting unit in said flat support area and against said hollow mounting section, said hollow mounting section being engagable upon bearings of said driven roller; and
    at least one support clip removably attachable to said mounting plate for accommodating a wheel of the baby supporting unit, said support clip having a base slidingly engagable with said ridged engaging portions of said hollow mounting section and said raised portion of said mounting plate, said base having a configuration that corresponds with the configuration of said ridged engaging portions.

15. The rocking device as set forth in claim 14, wherein said driving means is a motor, said motor being in electrical communication with a fuse, a two speed toggle switch, a timer switch, and a transformer.

16. The rocking device as set forth in claim 14, wherein said driven roller being a hollow tube including at least one aperture defined in said tube, and further comprising at least one stub for imparting further oscillation, said stub being removably attachable in said aperture of said driven roller and projecting out from said driven roller.

17. The rocking device as set forth in claim 14, wherein said raised portion and said hollow mounting section taper down to said flat support area so as to retain the baby supporting unit in said flat support area.

18. The rocking device as set forth in claim 14, wherein said support clip further comprising an arcuate upper part.

* * * * *